3,410,796
PROCESS FOR TREATMENT OF SALINE WATERS
Raymond James Hull, Orange, Calif., assignor, by mesne assignments, to Gas Processors, Inc., a corporation of California
Filed Apr. 4, 1966, Ser. No. 539,704
10 Claims. (Cl. 210—56)

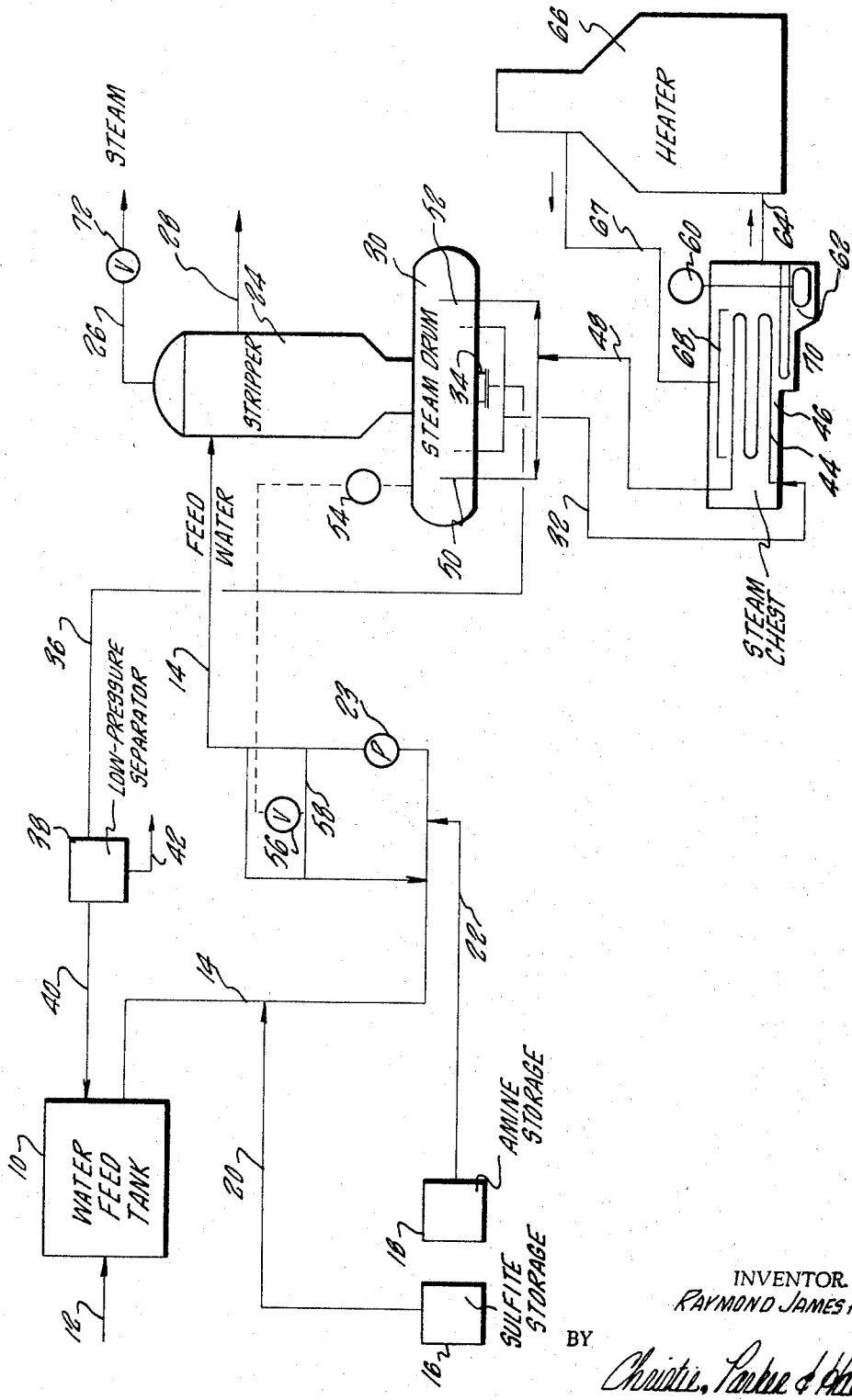

ABSTRACT OF THE DISCLOSURE

A process for treatment of raw water in which raw water is treated by passing it in direct countercurrent heat exchange with produced steam. The preheating of the raw water precipitates dissolved ions as insoluble salts. The preheated water is further heated by indirect heat exchange to produce the steam used to preheat the raw water.

---

This application relates to a process for treatment of saline or brackish waters for generation of steam which may then be used directly or condensed to produce softened or descaled water for oil field injection, boiler feed, or other uses.

Generation of steam requires careful monitoring of boiler feed water to avoid scaling and corrosion problems that act to decrease heat transfer efficiency and increase operating costs. In general, acceptable boiler feed water must be free of excessive amounts of non-ionic solids, of scale-forming ions, particularly calcium and magnesium, and of corrosive gases such as oxygen and carbon dioxide. Even where raw waters of moderate to average quality are employed, extensive pretreatment may be required. As to truly low quality raw waters, the foregoing criteria have often in the past made it economically impractical to utilize them for steam generation.

Although the process of the present invention is not limited to generation of steam or oil field secondary recovery processes, a description of it with reference to this particular utilization of steam will serve to illustrate the advantages and economy of the process. In oil fields, injection of steam has become increasingly prevalent to promote additional recovery of oil from underground formations. For this purpose, wet steam can be used. The steam effluent from prior art oil field steam generators for such flooding operations is from 60–90% by weight of steam. It is only because of the permissible low quality of the generated steam that it has been possible to utilize moderate quality raw waters as feed waters for prior art oil field steam generators.

Underground formation waters and even surface waters in oil fields commonly have one or more of the following, any one of which causes the waters to be termed "low quality": dissolved solids of 10,000 p.p.m. or higher; hardness as $CaCO_3$ of 300 to 1000 p.p.m.; oil content of 5 to 500 p.p.m.; silica content of 50 p.p.m. or higher. As earlier indicated, pretreatment of such water is mandatory if it is to be used for steam generation.

By the process of the present invention, low quality oil field waters may be used to generate steam having a quality approaching 100%. Since 98% quality steam is normally considered dry for most industrial applications, it is seen that the applicability of the present invention extends to steam generation for industrial uses as well as production of pure water, as will be described. However, although the quality of steam produced by the process of the invention exceeds by far the minimum requirements for steam injection, the economy of operation of the process makes its use feasible for oil field use. This is advantageous because, in many oil field underground formations, it is desirable to use high quality steam to avoid the build-up of high water saturations at the point of injection into the well.

The process of the present invention includes the step of passing raw water in direct countercurrent heat exchange relationship with produced steam to preheat the raw water to a temperature at which a substantial portion of dissolved calcium and magnesium ions are precipitated as insoluble salts. The preheated raw water is then passed into a reaction zone in which chemical reactions are completed with formation of additional precipitates. A portion of the water in the reaction zone is continuously removed and heated to convert a part of it to produced steam. This heating is by indirect heat exchange with a heated medium. Substantially all of the produced steam is then passed in the above-described heat exchange to preheat raw water. After this heat exchange, the steam is removed from the process for direct use of the steam or condensation of it to produce potable water.

In the process of the invention, direct countercurrent heat exchange between the raw feed water and the produced steam has an unexpected effect. Any oil, oxygen, or hydrogen sulfide in the raw water is stripped out. Further, as will be more completely explained at a later point by reference to specific examples, the full preheating of the raw water by direct condensation into it of a part of the steam results in chemical reactions which cause the calcium and magnesium ions to precipitate rapidly as insoluble salts. As a result, these salts are formed as sludge within the reaction zone into which the preheated raw water passes. The soluble calcium and magnesium ions remaining in the portion of the preheated raw water which is removed for indirect heat exchange to convert a part of it to steam represent only from a few tenths of one percent to a few percent of the total concentration of these ions in the raw water prior to preheating. The amount of soluble calcium and magnesium ions is dependent upon the amount of excess soluble carbonate ions present.

The advance removal of the ions which readily combine at high temperatures to precipitate as insoluble salts, e.g., calcium carbonate, magnesium carbonate, magnesium hydroxide, calcium sulfate, barium sulfate, and magnesium silicate, removes the principal scale-forming materials before the indirect heat exchange to produce steam. Scale formation is therefore minimized.

It will be noted that the above-described effects take place without the usual boiler treating processes, such as the cold or hot "lime-soda" processes, and without other softening processes, such as ion exchange or chelation.

The advantages and operation of the process of the present invention will be more fully understood from the following description made in conjunction with the accompanying drawing schematically depicting an embodiment of the process of the invention.

For purposes of explanation of the embodiment of the process shown in the accompanying drawing, the elements of the process are first described generally and then described in detail with reference to a particular raw water. Since the inclusion in the process of appropriate pumps and valves will be apparent to those skilled in the art from the following description, such equipment and related accessories have been omitted from the drawings and description to avoid unnecessary detail.

Raw water enters water feed tank 10 by a line 12 connecting the tank to the water source. After initial preheating of the raw water in tank 10 by flash steam from hot liquid blow down, the feed water leaves the tank by a line 14. Within water feed tank 10, any separated oil is removed from the top of the liquid surface and any settled solids are removed from the bottom of the tank through appropriate connections. Sodium sulfite from sulfite storage tank 16 and an amine inhibitor from amine storage tank 18 are injected by separate pumps through lines 20 and 22 respectively into the feed water in line 14.

The feed water is pumped by a pump 23 to the top of a feed stripper 24. The stripper is a vertical column having a series of baffles over which the feed water flows downwardly in direct countercurrent heat exchange with produced steam. Alternatively, the feed stripper may have from two to nine flat segmental trays provided with suitable wiper arrangements to scrape sludge deposits. Inlet feed connections can be arranged to enable feeding of feed water from line 14 to any one of the several feed trays. A main stram outlet line 26 is fitted into the top of the stripper and is used if the process is used to generate steam for use of the steam itself. A side steam outlet line 28 is fitted near the top of the stripper and is used if the generated steam is to be condensed to produce potable water.

The bottom of stripper 24 opens into a steam drum 30. The latter acts as a reaction zone in which preheated feed water leaving the stripper mixes with a more concentrated equilibrium mixture in the steam drum. A short residence time is provided for the preheated feed water. In the steam drum, chemical reactions are completed and the major portion of the insoluble salts are precipitated. To promote a short residence time for the partially treated feed water from the stripper, the steam drum may be vertically or horizontally segmented in part and provided with a weir arrangement for overflow into a section from which water is removed. A variety of arrangements may be used so that the chemical reactions in the water leaving the steam drum by line 32 have been completed. It is to be noted that the practice of the process does not require that precipitated insoluble salts settle out in the steam drum as sludge solids. All or part of the precipitated sludge can be included in the water leaving the steam drum.

A blown-down outlet 34 in the bottom of the steam drum is connected by a line 36 to a low-pressure blow-down separator 38. Typically, the blow down constitutes from 10 to 20% of the feed water. Flash steam separated in the blow-down separator passes by a line 40 to the water feed tank where it initially preheats raw water as already described. The remaining liquid leaves the separator by a line 42 through which it is passed to disposal.

Through line 32, water from steam drum 30 is passed to the inlet of heat exchanger tubes 44 in a steam chest 46. The water is circulated through tubes 44 within which a portion of it is converted to steam by indirect heat exchange, as will be described. The water-steam mixture passes from the outlet of the heat exchanger tubes into a steam drum feed line 48 which supplies two risers 50, 52 terminating in the upper portion of each end of the steam drum. The heat exchange within the steam chest produces about 20% to 40% steam within the heat exchanger tubes so that circulation between the steam drum and the steam chest is by a thermosyphon action.

The steam entering steam drum 30 passes upwardly through stripper 24 in direct heat exchange with feed water. A portion of it is condensed. The balance of the steam, which is saturated during upward flow through the stripper, leaves the top of the stripper through line 26. The latter is provided with a back-pressure controller 72. The liquid level in steam drum 30 is sensed by a level controller 54 which acts upon flow control valve 56 in a discharge line 58 to by-pass feed water as required to control the liquid level in the steam drum.

Although any suitable heated medium may be used, the shell side of steam chest 46 preferably contains a heat transfer salt, such as a sodium nitrite-potassium nitrate eutectic mixture. A pump 60 passes the heat transfer salt from a sump 62 within the steam chest through a line 64 to a gass-fired or oil-fired heater 66. After the heat transfer salt is heated, it is returned through a line 67 to a perforated distribution pan 68 within the steam chest. The hot salt flows from the pan over heat exchanger tubes 44 to convert a portion of the water to steam, as has already been described. Since the heat transfer salt has a melting point of about 300° F., a tubular heater 70 is positioned in sump 62 to melt the salt when the unit is initially started up.

Within the heat exchanger tubes, the water-steam temperature is typically in the range from 250° F. to 600° F. Because of the good heat transfer characteristics obtained through the use of the heat transfer salt and the minimum fouling of the heat exchanger tubes, the temperature of the heat transfer salt can be as little as 50° F. to 200° F. hotter than the water-steam temperature.

The process as generally described above can be operated over pressure ranges from slightly above atmospheric, as, for example, 5 p.s.i.g., to as high as 200 p.s.i.g., with corresponding steam temperature.

The process of the present invention will be further understood from the following description of treatment of a specific example of oil field formation water. The raw water contained about 200 p.p.m. of a heavy bitumen-like oil having a density approaching that of water and was saturated with 25 p.p.m. air. The ionic content of the water was as follows:

| Name | Formula | Molality |
|---|---|---|
| Calcium | $Ca^{++}$ | 0.00410 |
| Magnesium | $Mg^{++}$ | 0.00280 |
| Bicarbonate | $HCO_3^-$ | 0.01960 |
| Acid Silicate | $HSiO_3^-$ | 0.00190 |
| Sulfate | $SO_4^=$ | 0.00096 |
| Hydroxyl | $OH^-$ | (¹) |
| Sodium Chloride | $NaCl$ | ² 0.197 |

¹ pH=7.8.  ² 1.15% wt.

Raw water having the foregoing composition is classified as very hard. Its sodium chloride content is typical of California oil field brines and about one-half that of sea water. The raw water was treated with slightly more than stoichiometric amount of sodium sulfite as an oxygen scavenger and with an amine inhibitor prior to entering stripper 24 at the ninth tray above feed drum 30.

The following represent the pertinent operating conditions:

| | | |
|---|---|---|
| Feed | lbs./day | 760,000 |
| Boiler pressure | p.s.i.g. | 385 |
| Boiler temperature | ° F. | 460 |
| Steam drum blowdown | percent of feed | 20 |
| Area of boiler tubes | sq. ft. | 1,560 |
| Average stripper temperature | ° F. | 445 |
| Steam drum temperature | ° F. | 450 |
| Steam made on the tubes | lbs./day | 1,140,000 |

Within the stripper, nearly complete stripping of the oil content was accomplished by counterflowing produced steam. The oil was considered to have a 600° F. molal average boiling point and a molecular weight of 200. At the stripper temperature of 445° F. and two theoretical trays, the entire entrained oil phase was stripped out and less than one billionth of the 1.0 to 3.0 p.p.m. original dissolved oil remained. Equally, nearly complete stripping of the air content was accomplished within the stripper. Accordingly, the corrosion control requirement of extremely low values of residual oxygen content was met.

Within the stripper, the feed water is fully preheated by the direct condensation into it of steam to approximately one-half of the water weight. The following reactions are to be considered with respect to the stripper:

(1) $Ca(HCO_3)_2 = Ca^{++} + CO_3^= + CO_2\uparrow + H_2O$
(2) $Ca^{++} + CO_3^= = CaCO_3\downarrow$
(3) $CO_3^= + H_2O = 2OH^- + CO_2\uparrow$
(4) $Mg(HCO_3)_2 = Mg^{++} + CO_3^= + CO_2\uparrow + H_2O$
(5) $Mg^{++} + 2OH^- = 2Mg(OH)_2\downarrow$
(6) $Mg^{++} + CO_3^= + H_2O = Mg(OH)_2\downarrow + CO_2\uparrow$ (7) $Ca^{++} + SO_4^= = CaSO_4\downarrow$
(8) $Ba^{++} + SO_4^= = BaSO_4\downarrow$
(9) $2Mg^{++} + 3HSiO_3^- + OH^- = 2H_2O + Mg_2Si_3O_8\downarrow$ Of the precipitated products in the foregoing reactions, only barium sulfate (Reaction 8) becomes increasingly soluble with increasing temperature. The solubilities of calcium carbonate, magnesium hydroxide, calcium sulfate, and magnesium silicate decrease with both increasing temperatures and higher alkalinities.

At the temperature and conditions within the stripper, the reaction of calcium to form insoluble carbonate and silicate, and the reaction of magnesium to form insoluble hydroxide and silicate progress rapidly almost to completion. Carbon dioxide stripping by the steam is promoted through the partial pressure lowering effect of the steam within the stripper. As a result, with the feed water entering at the ninth tray above the steam drum, carbon dioxide release raises the pH of the feed water to approximately 10. At this pH, magnesium hydroxide and magnesium silicate are formed on an almost quantitative basis. Calcium carbonate is formed and has a limited solubility of 0.1 to 10.0 p.p.m., depending on the excess soluble carbonate ion present.

By the use of solubility curves over the required temperature and pH ranges, the following quantitative treatment of the reactions within the stripper can be made:

In the stripper, nominally all $HCO_3^-$ is destroyed because of the high temperature and the low $CO_2$ partial pressure environment. One $CO_3^=$ is formed from each two $HCO_3^-$ by Equation 1 so that $0.01960 \div 2 = 0.0093 CO_3^=$ is left. This amount of $CO_3^=$ leads to an approximate pH of 10.0.

The $0.0093 CO_3^=$ is available to satisfy the $Ca^{++}$ by Equation 2. Solubility data show calcium ion at 0.00009M at 445° F. and at 10.0 pH. As a result, the amount of calcium precipitated is $$(0.00410 - 0.00009) \times 100 \div 0.00410 = 97.8$$

percent. Soluble magnesium ion to satisfy $Mg(OH)_2$ is similarly found by solubility data to be 0.000002M. Since, however, the more soluble magnesium silicate dominates to allow 0.00022M of magnesium soluble as $Mg_2Si_3O_8$, precipitated magnesium is therefore $$(0.00280 - 0.00022) \times 100 \div 0.00280 = 92.1$$

percent.

The $CO_3^=$ remaining is 0.00930 minus $$(0.00410 - 0.00009) = 0.00529M$$

Nominally all of the $HSiO_3^-$ is associated with the magnesium by Reaction 9. This amount is $$.0019 \times 2/3 = 0.0013M$$

of the $Mg^{++}$. This leaves $0.0028 - 0.0013 = 0.0015$ of $Mg^{++}$ to form $Mg(OH)_2$ by Reaction 5. Reaction 9 uses $0.0019/2 = 0.0009$ of $OH^-$, and Reaction 5 uses $$2 \times 0.0015 = 0.0030$$

of $OH^-$, requiring a total of 0.0039 of $OH^-$. However, as shown above, $0.00529 CO_3^=$ was available to form $OH^-$ by Reactions 3 or 6, leaving $$0.00529 - 0.0039 \times 1/2 = 0.00334M \text{ of } CO_3^=$$

with all equilibria satisfied.

The solubility of $CaSO_4$ at 445° F. is shown to be 0.00085M, with a calculated solubility product of $$7.2 \times 10^{-7} = (Ca^{++}) + (SO_4^=)$$

The concentration of $SO_4^=$ ions in the feed is 0.00096M, which increases to 0.0048M in the boiler because of a 5 to 1 concentration resulting from 20% liquid blow down. The $0.0048 MSO_4^=$ allows a $Ca^{++}$ concentration up to 0.00015M before solid $CaSO_4$ forms. The soluble $Ca^{++}$ indicated above is limited to 0.00009M, so that solid $CaSO_4$ does not form.

In the foregoing description of treatment of an oil field formation water in accordance with the present invention, the concentration of $CO_3^=$ in the feed water was shown to be 0.00334M. Although a 5 to 1 concentration results from the blow down, giving $0.0167 MCO_3^=$, from 60% to 90% of the $CO_3^=$ is destroyed by Reaction 3 in the steam chest. As a result, only from about 0.00167M to $0.00668 MCO_3^=$ is available in the steam chest. By raising the $CO_3^=$ concentration through addition of sodium carbonate the soluble calcium ion concentration is limited to a level whereby, as above-described, calcium sulfate formation is controlled. To illustrate, addition of sodium carbonate to the above-described feed water to a concentration of $0.02 MCO_3^=$ in the steam chest reduced tube fouling to a point where the tubes were clean after two weeks' operation.

To produce softened or descaled water for oil field injection or similar uses, a high-pressure blow-down separator can be installed in line 36 between the steam drum and low-pressure separator 38. A large percentage liquid blow down is taken from the steam drum and passed to the high-pressure separator. Within the separator, the scale-forming elements, i.e., calcium sulfate, calcium carbonate, magnesium hydroxide, and silicates, are settled out as sludge with descaled water being drawn from the upper portion of the separator. In the production of descaled water as above-described, only a small amount of steam is removed from the stripper through line 26.

Within steam drum 30, the temperature is somewhat higher and the $OH^-$ and $CO_3^=$ coincentrations are higher than within the stripper. As a result, the above-described reactions are driven to near completion with attendant sludge solids formation. The rate of settling has been generally found to follow Stokes' law so that it is inversely proportional to fluid viscosities and directly proportional to density differences between the sludge and solution. These combined effects provide settling three times faster at 400° F. as at 200° F.

In the steam drum, additional carbon dioxide is released and a several-fold concentration of the treated water occurs. Consequently, the pH rises to 11–12. The additional time, higher pH, and higher $CO_3^=$ ion concentration complete the precipitation of insoluble salts.

The quality of the steam generated from the above-described water approached 100% in line 26. Condensation of the steam gave an effluent having a pH value of about 6.

Within the heat exchanger tubes in the steam chest, the actual scale deposit was a mixture of calcium carbonate and magnesium silicate with negligible amounts of sulfates and magnesium hydroxide. The scale had a density of 1.6 and a thermal conductivity of 0.25 B.t.u./sq. ft./° F./ft. Based upon a run of 100 days, the fouling of the tubes was found well within acceptable operating conditions for the equipment.

The process of the present invention may also be applied to sea water. A typical composition of sea water is as follows:

| Name | Formula | Molality |
| --- | --- | --- |
| Calcium | $Ca^{++}$ | 0.010 |
| Magnesium | $Mg^{++}$ | 0.052 |
| Sodium | $Na^+$ | 0.459 |
| Bicarbonate | $HCO_3^-$ | 0.002 |
| Chloride | $Cl^-$ | 0.533 |
| Sulfate | $SO_4^=$ | 0.028 |
| Hydroxyl | $OH^-$ | (1) |

[1] pH=7.0.

In accordance with the reaction criteria discussed above in conjunction with the foregoing example, the practice of the process on sea water having the above composition requires that the alkalinity be increased. When this is done by addition of sodium carbonate or sodium hydroxide, for example, to the raw water either at or in advance of direct heat exchange with produced steam, results comparable to those already described are obtained by the practice of the process.

In the practice of the process for making potable water, steam is removed from stripper 24 through line 28 and is condensed. Fuel economy is promoted by preheating feed water to condense the produced steam. This may be done through single or multiple stages of evaporation and condensation. When water is to be made, the removal of a small amount of steam through line 26 carries with it any offensive odors so that the steam removed through line 28 is essentially odor-free.

The foregoing descriptions of the practice of the process of the present invention will serve to illustrate its economy and versatility. It will be understood that modifications in specific aspects of its practice may be made without departing from the scope of the invention as claimed.

I claim:
1. A continuous process for treatment of raw water comprising the steps of passing raw water in direct countercurrent heat exchange relationship with produced steam to preheat the raw water to a temperature at which a substantial portion of dissolved calcium and magnesium ions are precipitated as insoluble salts, passing the preheated raw water into a reaction zone for completion of reactions, removing a portion of the water containing substantial quantities of the precipitated insoluble salts from the reaction zone and passing it in indirect heat exchange relationship with a heated medium to convert part of the water to produced steam, passing substantially all of the produced steam in the above-described heat exchange with raw water, and removing the balance of the produced steam.

2. Process in accordance with claim 1 wherein the preheated raw water is mixed with previously preheated water in the reaction zone.

3. Process in accordance with claim 1 wherein the raw water is preheated to a temperature in excess of 220° F.

4. Process in accordance with claim 1 wherein the heated medium is a heat transfer salt.

5. Process in accordance with claim 1 wherein from 20% to 40% of the water is converted to steam.

6. Process in accordance with claim 1 wherein $CO_3^=$ is added to the water to lower the soluble calcium ion concentration to a level whereby precipitation of calcium sulfate is controlled.

7. Process in accordance with claim 1 wherein the pH value of the preheated raw water is approximately 10.

8. Process in accordance with claim 7 wherein the pH value of the water removed from the reaction zone is in the range from 11 to 12.

9. Process in accordance with claim 1 wherein the raw water flows downwardly in a vertical column in direct countercurrent heat exchange relationship with upwardly flowing produced steam.

10. Process in accordance with claim 9 wherein steam is condensed in the raw water to the amount of approximately one-half of the weight of the water.

References Cited

UNITED STATES PATENTS

| 2,490,152 | 12/1949 | Oaks | 203–100 X |

FOREIGN PATENTS

| 162,837 | 5/1955 | Australia. |
| 208,503 | 5/1924 | Great Britain. |
| 669,928 | 4/1952 | Great Britain. |

MICHAEL E. ROGERS, *Primary Examiner.*